(12) United States Patent
Chen et al.

(10) Patent No.: US 6,596,419 B1
(45) Date of Patent: Jul. 22, 2003

(54) MEDIUM WITH A SEED LAYER AND A B2-STRUCTURED UNDERLAYER

(75) Inventors: Qixu Chen, Milpitas, CA (US); Li-Lien Lee, San Jose, CA (US); Rajiv Y. Ranjan, San Jose, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/960,538

(22) Filed: Sep. 24, 2001

Related U.S. Application Data

(60) Provisional application No. 60/236,011, filed on Sep. 27, 2000.

(51) Int. Cl.[7] .............................. G11B 5/66; G11B 5/70; H01J 1/00
(52) U.S. Cl. ................. 428/694 TS; 428/336; 428/611; 428/667; 428/900
(58) Field of Search .................. 428/694 TS, 900, 428/336, 611, 667

(56) References Cited

U.S. PATENT DOCUMENTS

| | | | |
|---|---|---|---|
| 5,693,426 A | 12/1997 | Lee et al. | 428/611 |
| 5,993,956 A | 11/1999 | Lambeth et al. | 428/332 |
| 6,010,795 A * | 1/2000 | Chen et al. | 428/611 |
| 6,077,586 A | 6/2000 | Bian et al. | 428/65.3 |
| 6,110,582 A | 8/2000 | Wu et al. | 428/332 |
| 6,143,388 A | 11/2000 | Bian et al. | 428/65.3 |
| 6,146,754 A | 11/2000 | Song et al. | 428/332 |
| 6,432,563 B1 * | 8/2002 | Zou et al. | 428/694 TS |

OTHER PUBLICATIONS

Li–Lien Lee et al., "Seed Layer Induced (002) Crystallographic Texture in NiAl Underlayers", Jrnl. of Appl. Phys., 79(8), Apr. 15, 1996.

* cited by examiner

Primary Examiner—Holly Rickman
(74) Attorney, Agent, or Firm—Morrison & Foerster LLP

(57) ABSTRACT

A bi-crystal magnetic recording media, i.e., media with Cr(200) and Co(11.0) orientations, comprising non-metallic substrates, CrTi or NiPOx seed layers, B2-structured CoTi first underlayers, Cr-alloy second underlayers, and Co-alloy magnetic layers have high coercivity, high SMNR and high areal recording density.

19 Claims, 7 Drawing Sheets

Carbon overcoat 37

Co-alloy containing magnetic layer 36

CoCr-alloy containing intermediate layer (optional) 35

Cr or Cr-alloy containing second underlayer 34

CoTi B2-structured first underlayer 33

Oxidized NiP or CrTi seed layer 32

Glass substrate 31

Carbon overcoat 37
Co-alloy containing magnetic layer 36
CoCr-alloy containing intermediate layer (optional) 35
Cr or Cr-alloy containing second underlayer 34
CoTi B2-structured first underlayer 33
Oxidized NiP or CrTi seed layer 32
Glass substrate 31

MEDIUM WITH A SEED LAYER AND A B2-STRUCTURED UNDERLAYER

RELATED APPLICATIONS

This application claims priority from Provisional Application Ser. No. 60/236,011 filed Sep. 27, 2000, entitled "Media with Seed Layers and B2-Structured Underlayers," the entire disclosure of which is hereby incorporated herein by reference.

FIELD OF INVENTION

This invention relates to magnetic recording media, such as thin film magnetic recording disks, and to a method of manufacturing the media. The invention has particular applicability to high areal density longitudinal magnetic recording media having very low medium noise, and more particularly, to a bi-crystal media.

BACKGROUND

The increasing demands for higher areal recording density impose increasingly greater demands on thin film magnetic recording media in terms of remanent coercivity (Hr), magnetic remanance (Mr), coercivity squareness (S*), signal-to-medium noise ratio (SMNR), and thermal stability of the media. In particular, as the SMNR is reduced by decreasing the grain size or reducing exchange coupling between grains, it has been observed that the thermal stability of the media decreases. Therefore, it is extremely difficult to produce a magnetic recording medium satisfying above mentioned demanding requirements.

Magnetic discs and disc drives provide quick access to vast amounts of stored information. Both flexible and rigid discs are available. Data on the discs is stored in circular tracks and divided into segments within the tracks. Disc drives typically employ one or more discs rotated on a central axis. A magnetic head is positioned over the disc surface to either access or add to the stored information. The heads for disc drives are mounted on a movable arm that carries the head in very close proximity to the disc over the various tracks and segments.

FIG. 1 shows the schematic arrangement of a magnetic disk drive 10 using a rotary actuator. A disk or medium 11 is mounted on a spindle 12 and rotated at a predetermined speed. The rotary actuator comprises an arm 15 to which is coupled a suspension 14. A magnetic head 13 is mounted at the distal end of the suspension 14. The magnetic head 13 is brought into contact with the recording/reproduction surface of the disk 11. A voice coil motor 19 as a kind of linear motor is provided to the other end of the arm 15. The arm 15 is swingably supported by ball bearings (not shown) provided at the upper and lower portions of a pivot portion 17.

A cross sectional view of a conventional longitudinal recording disk medium is depicted in FIG. 2. A longitudinal recording medium typically comprises a non-magnetic substrate 20 having sequentially deposited on each side thereof an underlayer 21, 21', such as chromium (Cr) or Cr-containing, a magnetic layer 22, 22', typically comprising a cobalt (Co)-base alloy, and a protective overcoat 23, 23', typically containing carbon. Conventional practices also comprise bonding a lubricant topcoat (not shown) to the protective overcoat. Underlayer 21, 21', magnetic layer 22, 22', and protective overcoat 23, 23', are typically deposited by sputtering techniques. The Co-base alloy magnetic layer deposited by conventional techniques normally comprises polycrystallites epitaxially grown on the polycrystal Cr or Cr-containing underlayer.

A conventional longitudinal recording disk medium is prepared by depositing multiple layers of films to make a composite film. In sequential order, the multiple layers typically comprise a non-magnetic substrate, one or more underlayers, one or more magnetic layers, and a protective carbon layer. Generally, a polycrystalline epitaxially grown cobalt-chromium (CoCr) alloy magnetic layer is deposited on a chromium or chromium-alloy underlayer.

Conventional methods for manufacturing a longitudinal magnetic recording medium with a glass, glass-ceramic, Al or Al—NiP substrate may also comprise applying a seed layer between the substrate and underlayer. A conventional seed layer seeds the nucleation of a particular crystallographic texture of the underlayer. Conventionally, a seed layer is the first deposited layer on the non-magnetic substrate. The role of this layer is to texture (alignment) the crystallographic orientation of the subsequent Cr-containing underlayer.

The seed layer, underlayer, and magnetic layer are conventionally sequentially sputter deposited on the substrate in an inert gas atmosphere, such as an atmosphere of argon. A conventional carbon overcoat is typically deposited in argon with nitrogen, hydrogen or ethylene. Conventional lubricant topcoats are typically about 20 Å thick.

A substrate material conventionally employed in producing magnetic recording rigid disks comprises an aluminum-magnesium (Al—Mg) alloy. Such Al—Mg alloys are typically electrolessly plated with a layer of NiP at a thickness of about 15 microns to increase the hardness of the substrates, thereby providing a suitable surface for polishing to provide the requisite surface roughness or texture.

Other substrate materials have been employed, such as glass, e.g., an amorphous glass, glass-ceramic material that comprises a mixture of amorphous and crystalline materials, and ceramic materials. Glass-ceramic materials do not normally exhibit a crystalline surface. Glasses and glass-ceramics generally exhibit high resistance to shocks.

Longitudinal magnetic recording media having Cr(200) and Co(11.0) preferred orientations are usually referred as bi-crystal media. Here, Cr(200) refers to BCC (body centered cubic) structured Cr-alloy underlayer or B2-structured underlayer with (200) preferred orientation. Generally, bi-crystal media have narrower c-axis dispersion than that of uni-crystal media. Therefore, bi-crystal media are more desirable than uni-crystal media, which have Co(10.0) preferred orientations. Typical bi-crystal media comprise Cr-containing alloy underlayers and Co-alloy magnetic layers. Cr-containing alloy has body centered cubic crystalline structure. Media with B2-structured CoTi underlayers were reported by Hong et al., "Enhancement of magnetic properties in CoCrPt longitudinal recording media by $Cr_{75}Ti_{25}$/CoTi bilayer," Journal of Applied Physics, Vol. 85, No. 8, p. 4298, 1999. Hong et al. directly deposited B2-structured CoTi films on substrates, and deposited CrTi and magnetic films on CoTi. Media with B2-structured underlayers usually have smaller grain size and narrower grain size distribution than the media with conventional Cr-alloy underlayers, hence have lower media noise.

Seagate U.S. Pat. No. 6,010,795, incorporated herein by reference, reveals bi-crystal magnetic recording media comprising B2-structured NiAl underlayers and with the film structure of NiPOx/Cr/NiAl/Cr/Co-alloy. U.S. Pat. No. 5,800,931 of Li-lien Lee et al., incorporated herein by reference, reveals bi-crystal magnetic recording media comprising B2-structured NiAl underlayers and crystalline MgO seed layers, and with the film structure of MgO/NiAl/

CoCrPt or MgO/CoTi/CoCrPt. U.S. Pat. No. 5,789,056 of Bian et al., incorporated herein by reference, reveals bi-crystal magnetic recording media comprising CrTi seed layers, Cr-alloy underlayers, and Co-alloy magnetic layers. Prior arts, generally, disclose a seed layer which is used underneath a Cr-containing underlayer, or a crystalline seed-layer underneath a CoTi underlayer such as mentioned in U.S. Pat. No. 5,933,956 (Lambeth) and U.S. Pat. No. 6,228,525 B1 (Shin). Lambeth requires a Mn-containing layer disposed between the substrate and magnetic layer, wherein the Mn-containing layer contains Mn in an amount sufficient for diffusion of Mn along the grain boundaries in the magnetic layer such that magnetic exchange coupling between grains is reduced.

In this invention, Mn is not preferred because Mn-containing layer has a significant problem of corrosion.

In order to squeeze as much digital information as possible on a recording disc medium there is a continuing need for improved areal density magnetic recording media exhibiting high coercivity and high SMNR. The need for lighter, smaller and better performing computers with greater storage density demands higher density hard disk media. It is an object of the present invention to meet those demands with an improved bi-crystal media having high coercivity and low noise.

SUMMARY OF THE INVENTION

The invention discloses bi-crystal magnetic recording media with B2-structured underlayers and NiPOx or CrTi seed layers. Applicants found that media according to the invention show much better magnetic properties than media with CoTi underlayers directly deposited on substrates such as media reported by Hong et al.

An embodiment of this invention is a magnetic recording medium, comprising a non-metallic substrate, an amorphous seed layer, a B2-structured first underlayer, a Cr-containing second underlayer and a magnetic layer, wherein the magnetic recording medium is a bi-crystal medium and does not have a Mn-containing layer disposed between the substrate and the magnetic layer. In other embodiments, the following variations are possible.

The magnetic recording medium further comprises an intermediate layer between the second underlayer and the magnetic layer. The seed layer comprises a material selected from the group consisting of oxidized NiP and CrTi. The B2-structured first underlayer comprises CoTi. The second underlayer comprises CrW. The magnetic layer comprises CoCrPtB. The seed layer comprises a material selected from the group consisting of oxidized NiP and CrTi, the B2-structured first underlayer comprises CoTi, the second underlayer comprises CrW, the intermediate layer comprises CoCrPt or CoCr, and the magnetic layer comprises CoCrPtB. A thickness of the seed layer is about 4 nm to about 16 nm. A thickness of the first underlayer is about 4 nm to about 60 nm. A thickness of the second underlayer is about 2.5 nm to about 5 nm and the second underlayer is located directly on the first underlayer.

Another embodiment relates to a method of manufacturing a magnetic recording medium comprising depositing an amorphous seed layer on a non-metallic substrate, depositing a B2-structured first underlayer on the seed layer, depositing a Cr-containing second underlayer on the first underlayer and depositing a magnetic layer on the second underlayer, wherein the magnetic recording medium is a bi-crystal medium and does not have a Mn-containing layer disposed between the substrate and the magnetic layer. The method of manufacturing a magnetic recording medium could further comprise depositing an intermediate layer between the second underlayer and the magnetic layer.

Yet another embodiment is a magnetic recording medium, comprising an amorphous seed layer and means for obtaining a bi-crystal crystallographic orientation, wherein the seed layer comprises a material selected from the group consisting of oxidized NiP and CrTi. In this invention, "means for obtaining a bi-crystal crystallographic orientation" refers to a non-metallic substrate, an amorphous seed layer, a B2-structured first underlayer, a Cr-containing second underlayer and a Co-alloy magnetic layer or equivalents thereof.

As will be realized, this invention is capable of other and different embodiments, and its details are capable of modifications in various obvious respects, all without departing from this invention. Accordingly, the drawings and description are to be regarded as illustrative in nature and not as restrictive.

DETAILED DESCRIPTION

Figure 1:
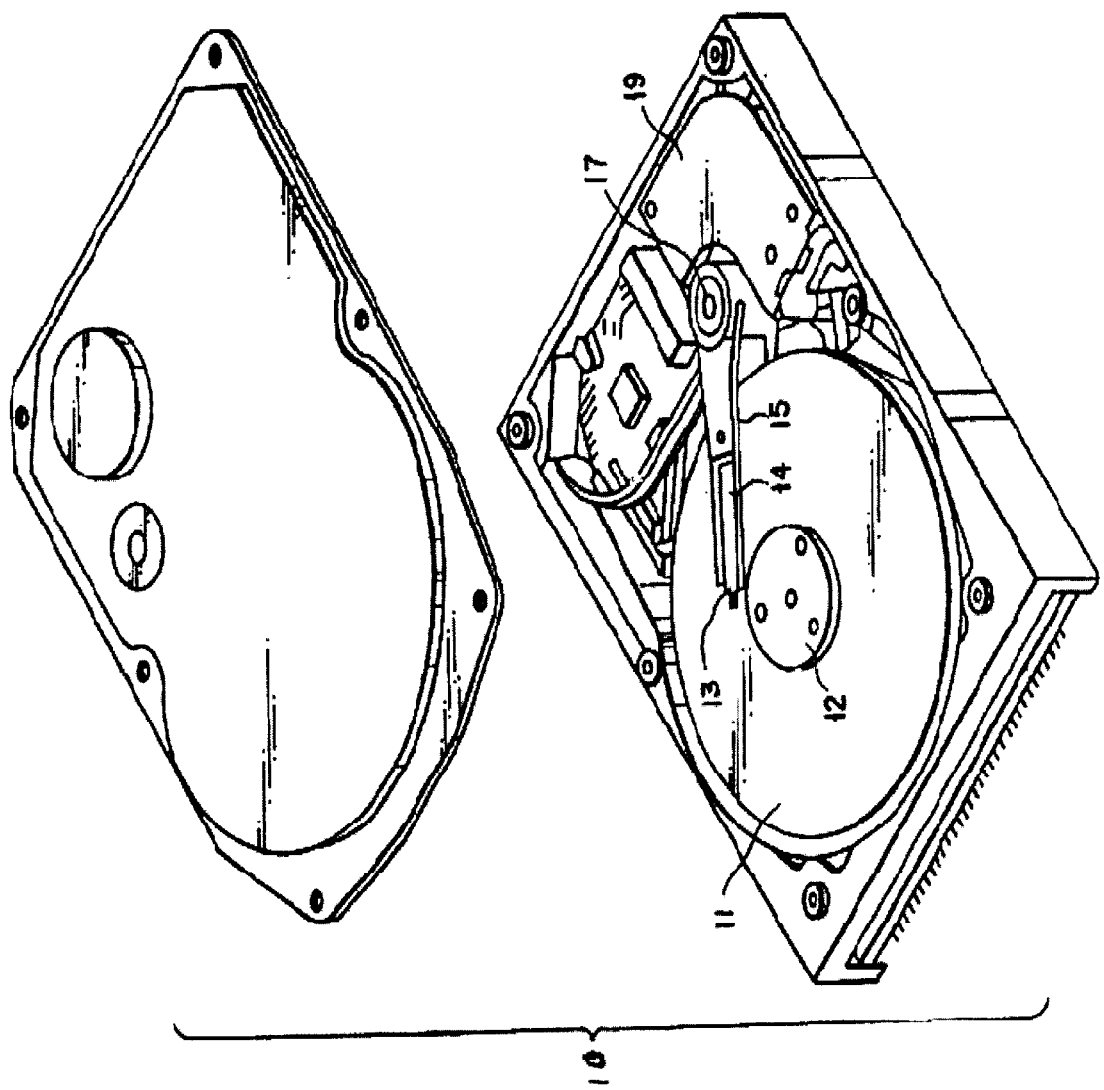
FIG. 1 is a view of a magnetic disk drive.
Figure 2:
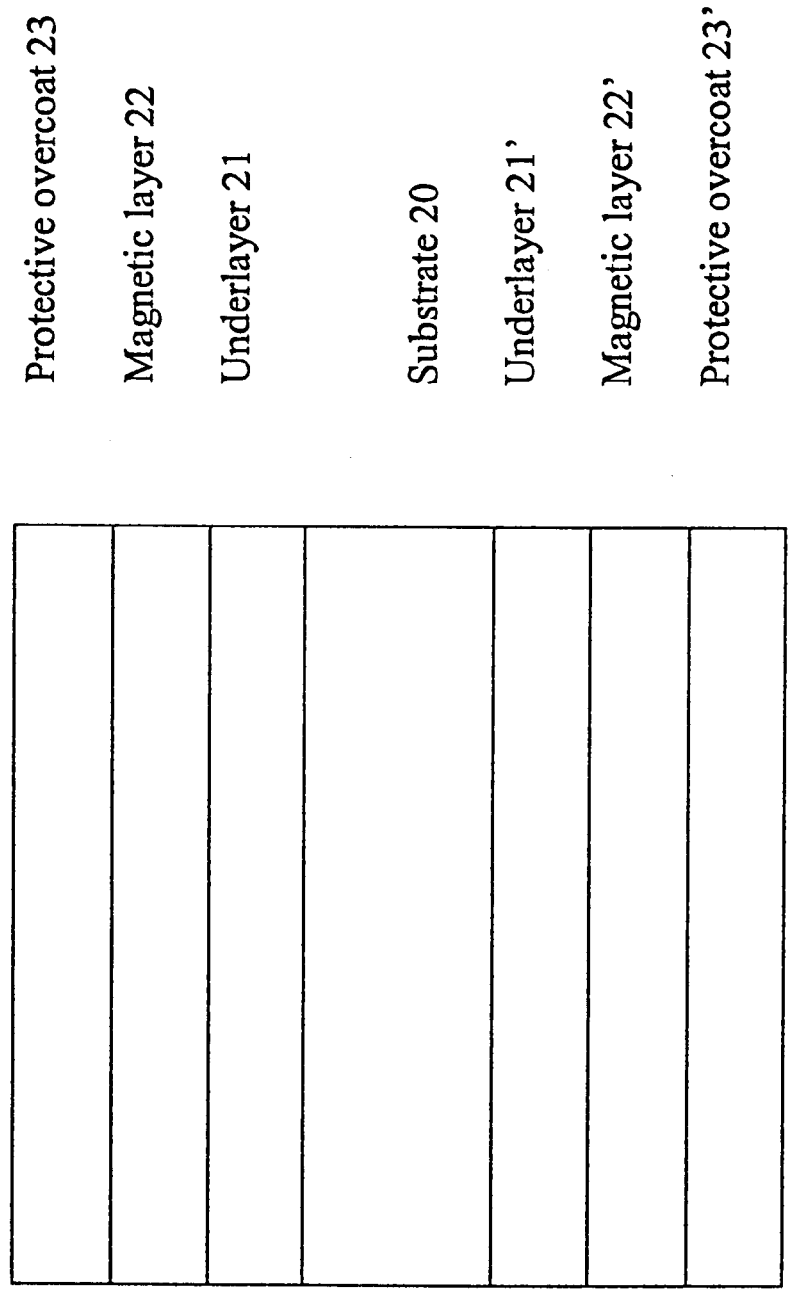
FIG. 2 is a schematic representation of the film structure in accordance with a magnetic recording medium of the prior art.

The recording media of the invention may be a rigid magnetic disc rotatable about an axis that is incorporated into a disc drive shown in FIG. 1. Disc drives such as this are standard equipment in the industry. See, Mee, C. D. and Daniel, E. D., MAGNETIC RECORDING, Vols. I–III (McGraw-Hill pub. 1987); F. Jorgenson, The Complete Handbook of Magnetic Recording, Chapter 16 (3rd. ed. 1988), and U.S. Pat. No. 5,062,021, the relevant disclosures of which are incorporated herein by reference. The magnetic recording media of the present invention may also be used with flexible magnetic discs or tapes using known flexible substrates.

This invention provides magnetic recording media suitable for high areal recording density exhibiting high thermal stability and high SMNR. This invention achieves such technological advantages by using bi-crystal magnetic recording media, i.e., media with Cr(200) and Co(11.0) orientations, comprising non-metallic substrates, CrTi or NiPOx seed layers, B2-structured CoTi first underlayers, Cr-alloy second underlayers, and Co-alloy magnetic layers. NiPOx denotes oxidized NiP.

Figure 3:
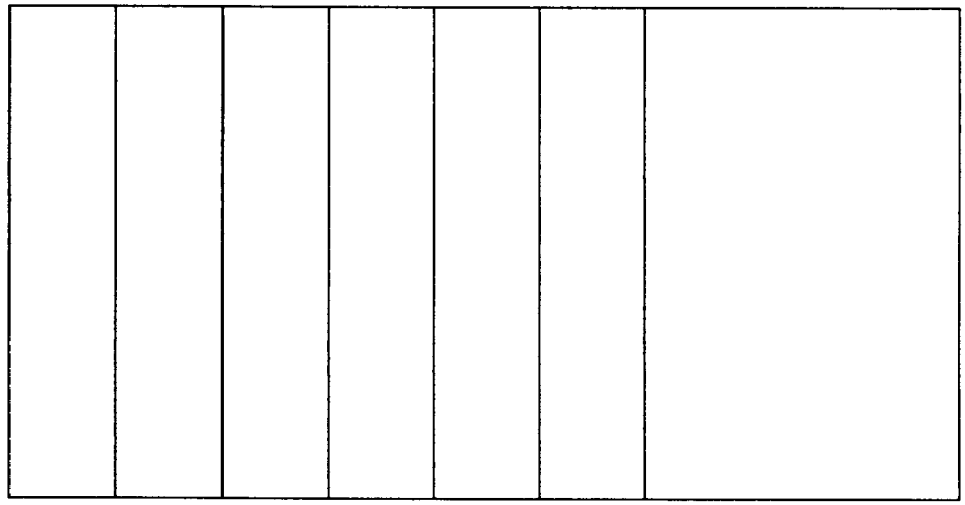
FIG. 3 shows an embodiment of the film structure according to the current invention.

FIG. 3 shows an embodiment of the film structure according to the current invention. A seed layer 32, such as surface-oxidized NiP, NiP oxidized from bottom to top, and CrTi, is deposited on a non-metallic substrate 31, such as glass, and glass-ceramic. The seed layer is selected such that CoTi and Cr-alloy underlayers 33 and 34 have preferred (200) crystallographic orientations. An optional CoCr-alloy intermediate layer 35, such as $CoCr_{37}$, and a Co-alloy magnetic layer 36 are epitaxially grown on the Cr-alloy underlayer and have (11.0) preferred orientations. Here $CoCr_{37}$ denotes that the atomic content of Cr in the CoCr films is 37%. On the magnetic layer is a carbon overcoat 37.

The CoTi-containing first underlayer in FIG. 3 forms a B2 structured layer. The Cr or Cr-alloy containing second underlayer has a Cr(200) preferred crystallographic orientation. Then, a magnetic layer having a substantially Co(11.0) preferred crystallographic orientation is deposited on the second underlayer. The term "B2-structured layer" means that the layer has a B2 structure.

In this application, word "containing," for example in Cr-containing, means that the layer comprises the elements or compounds before the word "containing" but the layer could still include other elements and compounds.

The Co-containing recording layer can comprise any Co-based alloy such as CoCrPt, CoCrPtTa, CoCrPtTaNb, CoCrPtB. Each recording layer can be single magnetic layer or dual magnetic layers immediately adjacent to each other.

In one embodiment, the NiP layer could contain P in the range of about 12–50 at. %, more preferably in the range of about 17–42 at. %, and most preferably in the range of about 18–25 at. %; the CoTi layer could contain Co in the range of about 40–60 at. %, more preferably in the range of about 45–58 at. %, and most preferably in the range of about 49–55 at. %; the CrTi layer could contain Ti in the range of about 20–80 at. %, more preferably in the range of about 25–70 at. %, and most preferably in the range of about 35–50 at. %; the CrW layer could contain W in the range of about 5–62 at. %, more preferably in the range of about 8–60 at. %, and most preferably in the range of about 10–58 at. %; the CoCrPtB layer could contain Cr in the range of about: 8–22 at. %, more preferably in the range of about 9–20 at. %, and most preferably in the range of about 10–16 at. %, Pt in the range of about 5–20 at. %, more preferably in the range of about 8–19 at. %, and most preferably in the range of about 10–16 at. %, and B in the range of about 5–25 at. %, more preferably in the range of about 6–20 at. %, and most preferably in the range of about 10–18 at. %; the CoCr intermediate layer could contain Cr in the range of about 30–45 at. %, more preferably in the range of about 31–44 at. %, and most preferably in the range of about 35–43 at. %; and the CoCrPt intermediate layer could contain Cr in the range of about 30–45 at. %, more preferably in the range of about 31–44 at. %, and most preferably in the range of about 35–43 at. % and Pt in the range of about 3–12 at. %, more preferably in the range of about 4–9 at. % and most preferably in the range of about 5–6 at. %.

In a variation, there could further be a subseed layer of about 1.0 nm to about 160 nm thickness below the seed layer to nucleate growth. A portion of the subseed layer, the seed layer and/or the underlayer(s) could be oxidized by being sputter deposited with Ar and oxygen to promote a decrease in grain size. The term "a portion of" is defined herein to include all or part of a layer. Therefore, the entire layer, i.e., extending from one end of the layer to the opposite end of the layer may be in the oxidized form.

The carbon overcoat in FIG. 3 could be further coated with a lubricant layer generally 1 nm to 3 nm thick. The lubricant is preferably a fluoro-chlorocarbon or a perfluoroether. Examples include $CCl_2FCClF_2$, $CF_3(CF_2)_4CF_3$, $CF_3(CF_2)_5CF_3$, $CF_3(CF_2)_{10}CF_3$, and $CF_3(CF_2)_{16}CF_3$.

The substrates that may be used in the invention include glass, glass-ceramic, plastic/polymer material, ceramic, glass-polymer, composite materials or other non-magnetic and non-metallic materials.

Desirably, the lattice constant and the crystal plane of the subseed layer, if used, should closely match that of the seed layer. Similarly, matching between other layers, except with carbon overcoat, is also desirable. As a consequence of lattice and crystalline plane matching, the magnetic layer, in turn, will grow in a close-packed hexagonal structure with a Co(11.0) crystallographic orientations predominantly parallel to the film plane with the magnetic easy axis, c-axis, lying predominantly in the film plane.

In a preferred embodiment, the thickness of the seed layer could be about 30 Å to about 1600 Å, preferably between about 40 Å and about 1200 Å, and most preferably between about 40 Å and about 160 Å. The thickness of the first underlayer could be about 20 Å to about 1,000 Å, preferably between about 25 Å and about 800 Å, and most preferably between about 40 Å and about 600 Å. The thickness of the second underlayer could be about 5 Å to about 100 Å, preferably between about 15 Å and about 60 Å, and most preferably between about 25 Å and about 50 Å. The thickness of the recording layer could be about 60 Å to about 300 Å, preferably between about 80 Å and about 200 Å, and most preferably about 100–190 Å. The thickness of the intermediate layer of FIG. 3, if used, could be about 10 Å to about 60 Å, preferably between about 15 Å and about 50 Å, and most preferably about 20–25 Å. The thickness of the protective layer could be about 20 Å to about 300 Å, preferably between about 25 Å and 100 Å, and most preferably about 40 Å. The protective layer could be made of hydrogenated carbon ($CH_x$).

In one variation, an adhesion enhancement layer, such as 35 Å of Cr films, can be deposited between the seed layers and the substrates. The thickness of the adhesion layer could be about 15 Å to about 200 Å, preferably between about 20 Å and about 60 Å, and most preferably about 40 Å.

The magnetic recording medium has a remanent coercivity of about 3000 to about 10,000 Oersted, and an Mrt (product of remanance, Mr, and magnetic layer thickness, t) of about 0.2 to about 2.0 memu/cm². In a preferred embodiment, the coercivity is about 3500 to about 7000 Oersted, more preferably in a range of about 4000 to about 6000 Oersted, and most preferably in a range of about 4000 to about 5000 Oersted. In a preferred embodiment, the Mrt is about 0.25 to about 1 memu/cm², more preferably in a range of about 0.3 to about 0.6 memu/cm², and most preferably in a range of about 0.3 to about 0.5 memu/cm².

It is believed that the CrTi and NiPOx seed layers enhance the development of CoTi/Cr(200) and Co(11.0) crystallographic orientation, and help to reduce grain size of CoTi/Cr-alloy underlayers. The seed layers also reduce thermal emissivity of glass and glass ceramic substrates, hence reduce the cooling rate of the glass discs after heating.

EXAMPLES

All samples described in this disclosure were fabricated with DC magnetron sputtering. SMNR was measured using a Guzik 1701 spinstand. It analyzes the noise spectrum from the output of a read head you attach to it. The background noise and dc-noise were subtracted to leave only the noise coming from the media themselves.

Figure 4:
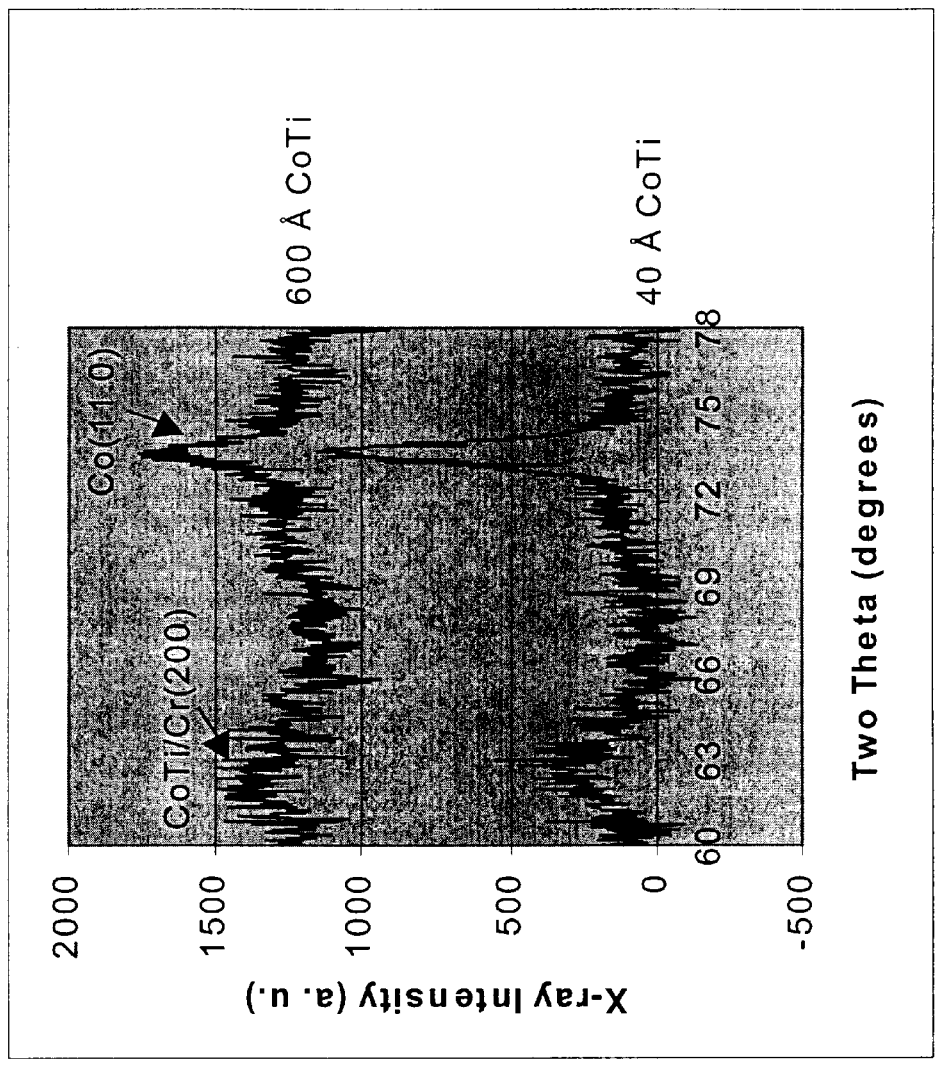
FIG. 4 shows X-ray diffraction (XRD) patterns of $NiP_{20}O_x/CoTi_{50}/CrW_{15}/CoCr_{37}Pt_5/CoCr_{15}Pt_{10}B_{12}$ films deposited on a glass substrate with 40 Å and 600 Å of CoTi respectively.

FIG. 4 shows X-ray diffraction (XRD) patterns of $NiP_{20}Ox/CoTi_{50}/CrW_{15}/CoCr_{37}Pt_5/CoCr_{15}Pt_{10}B_{12}$ films with 40 Å and 600 Å of CoTi respectively. $NiP_{20}O_x$ denotes oxidized $NiP_{20}$ film. The XRD patterns demonstrate that the films have bi-crystal crystallographic orientations. NiP films are amorphous. The oxidized NiP films can be formed by surface oxidization in the atmosphere of air or gas mixture of 20% oxygen and 80% argon in volume. The films also can be formed by reactive sputtering of NiP in the gas mixture, for instance, of 1% oxygen in volume and argon in balance.

Figure 5:
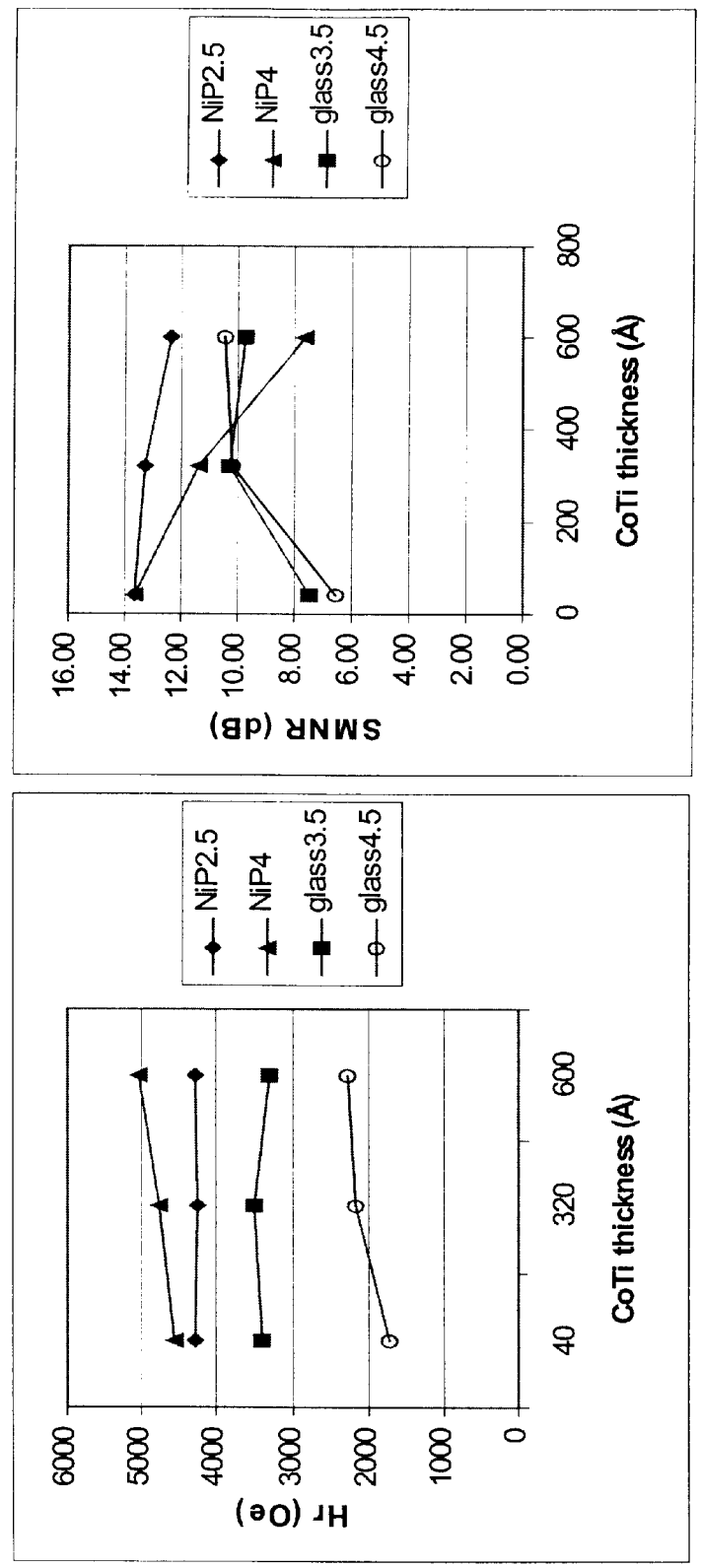
FIG. 5 shows a comparison of Hr and SMNR of the media with NiPOx seed layers deposited under first heater power of 2.5 and 4 kW respectively, and the media directly deposited on glass without seed layers and under first heater power of 3.5 and 4.5 kW respectively.
Figure 6:
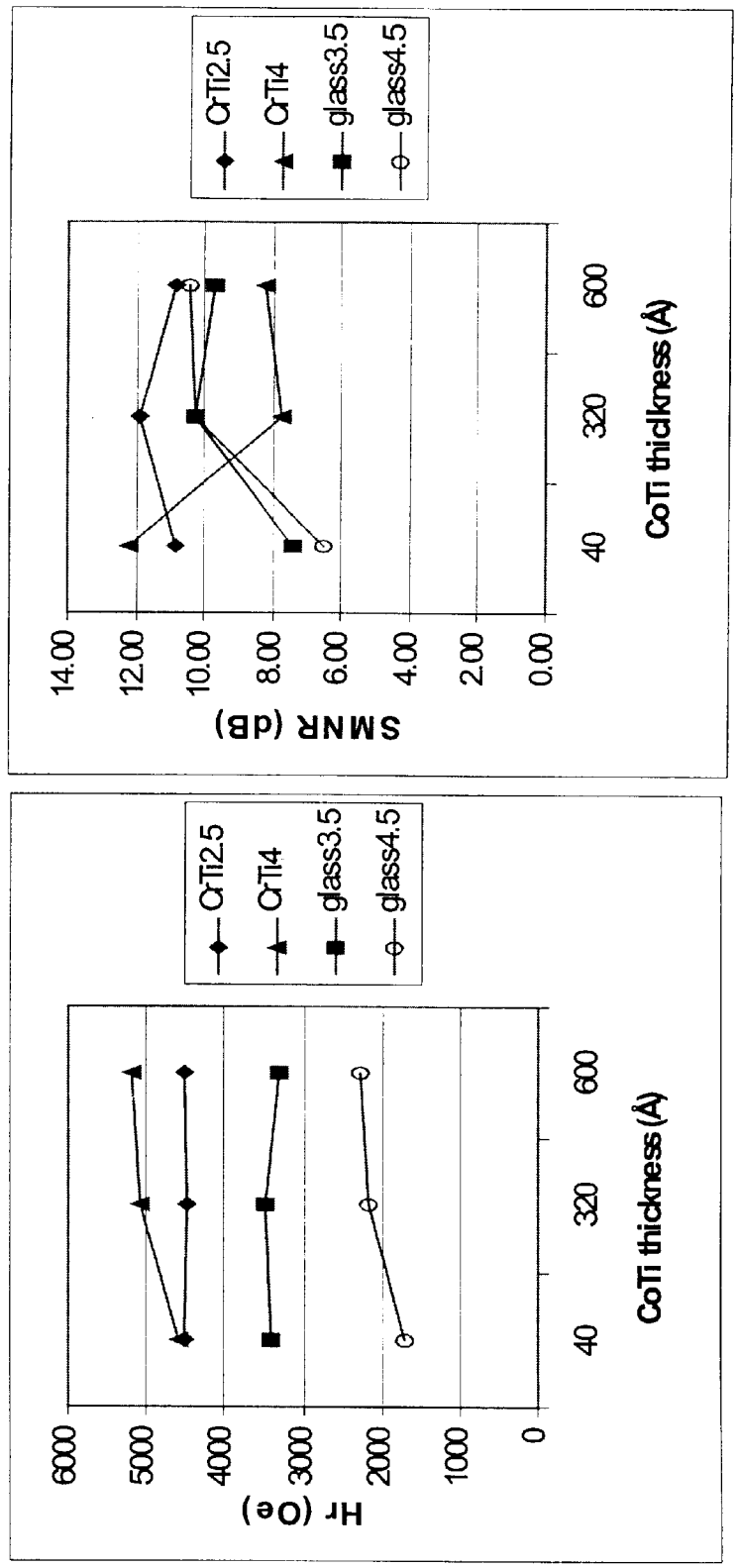
FIG. 6 shows a comparison of Hr and SMNR of the media with CrTi seed layers deposited under first heater power of 2.5 and 4 kW respectively, and the media directly deposited on glass without seed layers and under first heater power of 3.5 and 4.5 kW respectively.

FIGS. 5 and 6 show a comparison of magnetic properties and recording performances of media with and without seed layers deposited on glass disc substrates of 84 mm diameter and 0.8 mm thick. A commercial Intevac 250-B sputter system was used for fabricating the media. The discs were heated using two heaters. The first heater was located between the NiP or CrTi seed layer deposition station and the CoTi first underlayer deposition station. The second heater was located between the $CoCr_{37}Pt_5$ second intermediate layer station and the $CoCr_{15}Pt_{10}B_{12}$ magnetic layer deposition station. When the first heater power was 2.5 or 3.5 kW, the second heater power was 1 kW. When the first heater power was 4 or 5.5 kW, the second heater power was 0 kW. Heater power duration was 4.5 seconds. The media without seed layers were directly deposited on glass substrates. Direct current (DC) magnetron sputtering was used for the deposition of all the films. The thickness of each layer of three (3) kinds of media is listed in Table I.

TABLE I

Thickness of each layer of the films shown in FIGS. 5 and 6

| Seed layer | $CoTi_{50}$ | $CrW_{15}$ | $CoCr_{37}Pt_5$ | $CoCr_{15}Pt_{10}B_{12}$ |
|---|---|---|---|---|
| 160 Å $NiP_{20}O_x$ | varied | 50 Å | 44 Å | 190 Å |
| 160 Å $CrTi_{43}$ | varied | 50 Å | 44 Å | 190 Å |
| none (glass) | varied | 50 Å | 44 Å | 190 Å |

Remanent coercivity Hr of the disc samples was measured with a rotating disc magnetometer (RDM). The media signal-to-noise ration (SMNR) was measured with a Guzik read-write analyzer with a giant magnetoresistive (GMR) head at 500 thousand flux reversal per inch (kfci).

FIGS. 5 and 6 demonstrate that media with NiPOx or CrTi seed layers have much higher coercivity than the media without seed layers and having the CoTi underlayers directly deposited on glass substrates. The media with seed layers and deposited with 40 Å CoTi have much higher SMNR than the media without seed layers.

Figure 7:
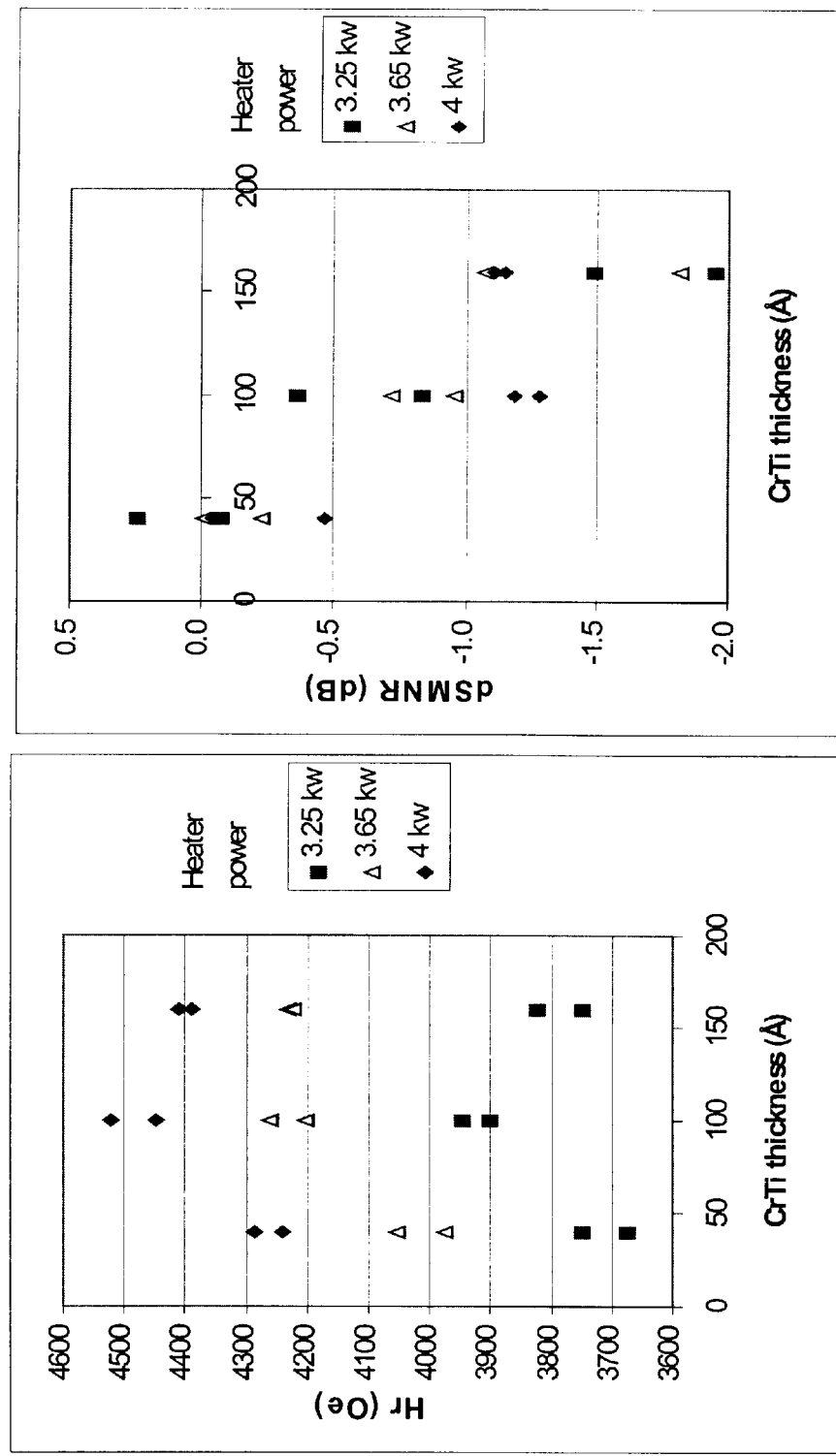
FIG. 7 shows CrTi thickness effect on Hr and SMNR of $CrTi_{43}/CoTi_{50}/CrW_{15}/CoCr_{37}Pt_5/CoCr_{15}Pt_{10}B_{12}$ films, deposited on glass substrates.

FIG. 7 shows CrTi thickness effect on Hr and SMNR of $CrTi_{43}/CoTi_{50}/CrW_{15}/CoCr_{37}Pt_5/CoCr_{15}Pt_{10}B_{12}$ films deposited with the first heater only. CoTi thickness is 40 Å. CrW, CoCrPt and CoCrPtB thickness is the same as listed in Table I. When CrTi thickness increases from 40 Å to 160 Å, SMNR decreases significantly. $CrTi_{43}$ films are amorphous.

Cr-containing second underlayers promote the formation of a well-developed Co(11.0) orientation, which provides good magnetic properties. Table II compares the media with and without CrW, the second underlayer. Both Samples A and B of Table II have 320 Å of CoTi. The other layers of Samples A and B are the same as those listed in the second row of Table I except the CrW layer. Sample B, the medium without CrW, has much lower Hr and remanent coercivity squareness Sr* than the media with CrW.

TABLE II

Magnetic properties of media with and without CrW underlayers

| Samples | $CrW_{15}$ thickness (Å) | Hr (Oe) | Sr* |
|---|---|---|---|
| A | 50 | 4250 | 0.85 |
| B | 0 | 1445 | 0.70 |

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein.

This application discloses several numerical range limitations. This invention can be practiced throughout the disclosed numerical ranges. Finally, the entire disclosure of the patents and publications referred in this application are hereby incorporated herein by reference.

What is claimed is:

1. A magnetic recording medium, comprising a non-metallic substrate, an amorphous seed layer, a B2-structured first underlayer directly on the amorphous seed layer, a Cr-containing second underlayer and a magnetic layer, wherein the magnetic recording medium is a bi-crystal medium and does not have a Mn-containing layer disposed between the substrate and the magnetic layer.

2. The magnetic recording medium of claim 1, further comprising an intermediate layer between the second underlayer and the magnetic layer.

3. The magnetic recording medium of claim 1, wherein the seed layer comprises a material selected from the group consisting of oxidized NiP and CrTi.

4. The magnetic recording medium of claim 1, wherein the B2-structured first underlayer comprises CoTi.

5. The magnetic recording medium of claim 1, wherein the second underlayer comprises CrW.

6. The magnetic recording medium of claim 1, wherein the magnetic layer comprises CoCrPtB.

7. The magnetic recording medium of claim 2, wherein the seed layer comprises a material selected from the group consisting of oxidized NiP and CrTi, the B2-structured first underlayer comprises CoTi, wherein the second underlayer comprises CrW, the intermediate layer comprises CoCrPt or CoCr, and the magnetic layer comprises CoCrPtB.

8. The magnetic recording medium of claim 1, wherein a thickness of the seed layer is about 3 nm to about 16 mn.

9. The magnetic recording medium of claim 1, wherein a thickness of the first underlayer is about 2 nm to about 100 nm.

10. The magnetic recording medium of claim 1, wherein a thickness of the second underlayer is about 0.5 nm to about 10 nm and the second underlayer is located directly on the first underlayer.

11. A method of manufacturing a magnetic recording medium comprising depositing an amorphous seed layer on a non-metallic substrate, depositing a B2-structured first underlayer directly on the seed layer, depositing a Cr-containing second underlayer on the first underlayer and depositing a magnetic layer on the second underlayer, wherein the magnetic recording medium is a bi-crystal medium and does not have a Mn-containing layer disposed between the substrate and the magnetic layer.

12. The method of manufacturing a magnetic recording medium of claim 11, further comprising depositing an intermediate layer between the second underlayer and the magnetic layer.

13. The method of manufacturing a magnetic recording medium of claim 11, wherein the seed layer comprises a material selected from the group consisting of oxidized NiP and CrTi.

14. The method of manufacturing a magnetic recording medium of claim 11, wherein the B2-structured first underlayer comprises CoTi.

15. The method of manufacturing a magnetic recording medium of claim 11, wherein the second underlayer comprises CrW.

16. The method of manufacturing a magnetic recording medium of claim 11, wherein the magnetic layer comprises CoCrPtB.

17. The method of manufacturing a magnetic recording medium of claim 12, wherein the seed layer comprises a material selected from the group consisting of oxidized NiP and CrTi, the B2-structured first underlayer comprises CoTi, wherein the second underlayer comprises CrW, the intermediate layer comprises CoCrPt or CoCr, and the magnetic layer comprises CoCrPtB.

18. The method of manufacturing a magnetic recording medium of claim 11, wherein a thickness of the seed layer is about 3 nm to about 16 nm.

19. The method of manufacturing a magnetic recording medium of claim 11, wherein a thickness of the first underlayer is about 2 nm to about 100 nm.

* * * * *